US011108666B2

(12) United States Patent
Huddleston et al.

(10) Patent No.: US 11,108,666 B2
(45) Date of Patent: Aug. 31, 2021

(54) LATENCY PREDICTION AND NETWORK MESSAGE MICROTIMING

(71) Applicant: MORGAN STANLEY SERVICES GROUP INC., New York, NY (US)

(72) Inventors: Richard Huddleston, Jericho, NY (US); Ahmed Jedda, Montreal (CA); Erhan Senlik, Port Jefferson Station, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/433,095

(22) Filed: Jun. 6, 2019

(65) Prior Publication Data

US 2020/0389380 A1 Dec. 10, 2020

(51) Int. Cl.
*H04L 12/26* (2006.01)
*H04B 17/364* (2015.01)
*H04W 84/18* (2009.01)
*H04B 17/391* (2015.01)

(52) U.S. Cl.
CPC ....... *H04L 43/0852* (2013.01); *H04B 17/364* (2015.01); *H04B 17/3912* (2015.01); *H04B 17/3913* (2015.01); *H04W 84/18* (2013.01)

(58) Field of Classification Search
None
See application file for complete search history.

(56) References Cited

U.S. PATENT DOCUMENTS

| 7,631,096 B1 | 12/2009 | Yeh et al. |
| 7,701,852 B1 | 4/2010 | Hohn et al. |
| 2014/0126395 A1 | 5/2014 | Matthews et al. |
| 2015/0163155 A1 | 6/2015 | Beheshti-Zavareh et al. |

(Continued)

FOREIGN PATENT DOCUMENTS

JP  2004312725 A  11/2004

OTHER PUBLICATIONS

Pappas. "Performance Analysis of a System with Bursty Traffic and Adjustable Transmission Times", arXiv.org, Sep. 8, 2018 [retrieved on Jun. 17, 2021], Retrieved from the Internet: <URL: https://arxiv.org/abs/1809.02825>. (Year: 2018).*

*Primary Examiner* — Kevin T Bates
*Assistant Examiner* — Dae Kim
(74) *Attorney, Agent, or Firm* — Weitzman Law Offices, LLC (57) ABSTRACT

A system for network message microtiming, comprising a central routing device, a first mesh network, and a second mesh network. The central routing device continuously receives utilization data from one or more devices of the first mesh network; continuously receives timing data from one of more devices of the second mesh network; builds and continuously updates a probabilistic future latency model based at least in part on the utilization data and the timing data; receives a message from a client computing device comprising data to be sent to at least one of a plurality of remote computing devices via the first mesh network; determines that a current expected latency according to the future latency model exceeds a predetermined threshold; and as a result delays transmission of a packet comprising the data to be sent to the at least one of the plurality of remote computing devices.

11 Claims, 4 Drawing Sheets

(56) References Cited

U.S. PATENT DOCUMENTS

| | | | |
|---|---|---|---|
| 2015/0326485 A1* | 11/2015 | Novak | H04L 47/28 |
| | | | 370/229 |
| 2016/0218979 A1* | 7/2016 | Roh | H04L 43/16 |
| 2019/0260824 A1* | 8/2019 | Pitio | H04L 67/325 |
| 2019/0280954 A1* | 9/2019 | Volos | G06N 7/005 |
| 2020/0153701 A1* | 5/2020 | Mohan | H04L 47/365 |

* cited by examiner

LATENCY PREDICTION AND NETWORK MESSAGE MICROTIMING

FIELD OF INVENTION

This application relates to networking devices and methods, and more specifically, for devices, systems, and methods for anticipating spikes in network latency and changing transmission behavior to account for the expected latency.

BACKGROUND

In network design and engineering, systems must be designed keeping in mind that any physical system used to convey a message has both a latency and a non-zero probability that a message sent will fail to be received due to link or node failure. This idea is illustrated by the "Byzantine Generals' Problem," a thought experiment where, in one variation, two generals must coordinate an attack at a specific time through courier messages. The two generals can never know with 100% certainty that they both have the same knowledge regarding what the other knows; there is always a possibility that one's last confirmation has not been received, and thus that the counterpart should assume that the lack of confirmation means the message that the counterpart had sent was not received. Each may be paralyzed from acting without assurance that their counterpart will act in concert with them.

There exist modern systems that, albeit at lower stakes, need to account for the same principle of unreliability. TCP/IP (the Transmission Control Protocol/Internet Protocol) is designed to transmit packets, wait for confirmation, and re-transmit in response to failure to receive confirmation within a fixed time. If increased network latency causes confirmations to arrive outside of this window, every packet will be sent at least twice, massively increasing congestion in the network. Networks between financial traders and markets, such as those used in high-frequency trading and currency arbitrage, need to provide not only low-latency and high-reliability transmission capability, but also to avoid transmissions of offers based on obsolete data or acceptances of offers that have since been revoked. As a result, there is always a need in networking protocols to anticipate latency and adapt messaging and confirmation schemes to avoid unnecessary data transmissions or transmissions that will depend upon a network state that no longer exists at the time of transmission.

SUMMARY OF THE INVENTION

Disclosed herein is a system for network message microtiming, comprising a central routing device, a first mesh network comprising the central routing device and used by the central routing device to transmit data based at least in part on messages from a client computing device, and a second mesh network comprising the central routing device and used by the central routing device to receive messages comprising data to be forwarded at least in part to the client computing device. The central routing device comprises a processor and non-transitory memory storing instructions that, when executed by the processor, cause the processor to: continuously receive utilization data from one or more devices of the first mesh network; continuously receive timing data from one or more devices of the second mesh network; build and continuously update a probabilistic future latency model based at least in part on the utilization data and the timing data; receive a message from the client computing device comprising data to be sent to at least one of a plurality of remote computing devices via the first mesh network; determine that a current expected latency according to the future latency model exceeds a predetermined threshold; and responsive to determining that the current expected latency exceeds the predetermined threshold, delay transmission of a packet comprising the data to be sent to at the least one of the plurality of remote computing devices.

In various embodiments, transmission of the packet may be delayed until current expected latency does not exceed the predetermined threshold, or until there is a minimum current expected latency within a maximum time limit. The probabilistic future latency model may be based at least in part on a k-nearest neighbors regression model incorporating the utilization data and the timing data, which may themselves be based on total utilization capacity or data throughput on the first mesh network and on timestamped messages sent through the second mesh network.

Further disclosed are a networking device and a computer-performed method for performing aspects of the system described above.

DETAILED DESCRIPTION

Figure 1:
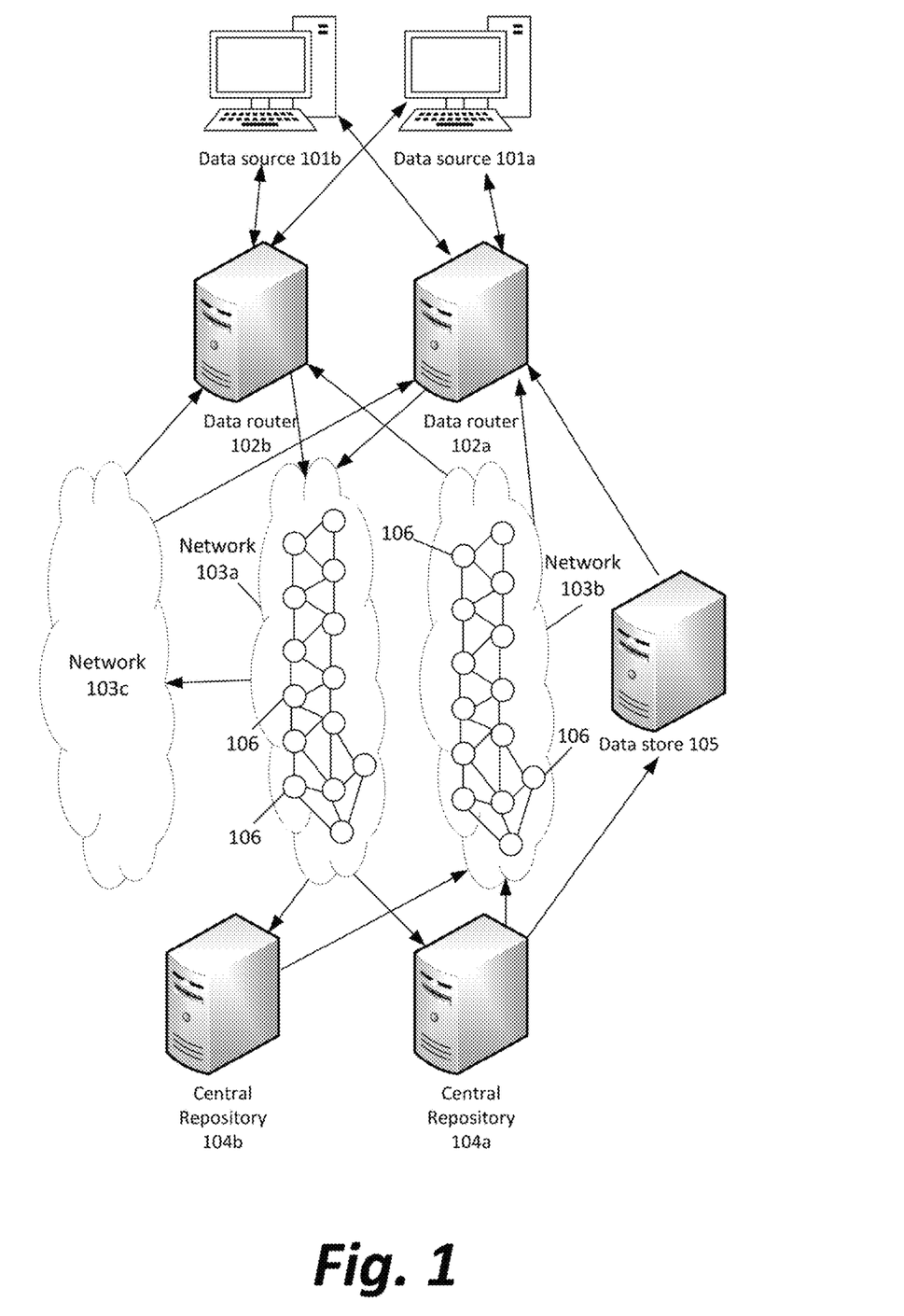
FIG. 1 depicts a networked computing system for transmitting time-sensitive communications requiring coordination between a sender and a receiver.

FIG. 1 depicts a networked computing system for transmitting time-sensitive communications requiring coordination between a sender and a receiver.

With reference now to FIG. 1, a network may include a number of data origins 101a, 101b, etc., which pass data to at least one data router from a set of data routers 102a, 102b, etc. The arrows in FIG. 1 are used to show data transmissions that are bidirectional or unidirectional, as shown by the directions indicated by the arrows. The data routers 102a, 102b, etc. are, in a preferred embodiment, not merely configured to blindly forward messages according to addresses within a protocol such as the IP protocol, but rather fully programmable in a scripting or other programming language to allow forwarding or manipulation of message data according to rules of arbitrary complexity. The data routers 102a, 102b, etc. are also preferably ultra-low latency routers, capable or forwarding a received message towards one or more destinations within 225 nanoseconds of receipt, even if processing must be performed on the message to change its payload or make decisions to forward copies or modified messages to multiple recipients.

Each data router 102 may pass data to one or more central repositories 104a, 104b, etc. via a first mesh network 103a comprising other network devices 106. Each data router 102 receives data back from the one or more central repositories 104 via a second mesh network 103b. The mesh networks each provide a redundant and distributed connection functionality to ensure that the failure of any single node between a data router 102 and a central repository 104 can be routed around rather than causing an inability to communicate.

In some embodiments, a data store 105 may receive information from the central repositories 104a-104n and feed additional information to data router 102, the additional information being considered at data router 102 in modifying the received data from data origins 101a-101n before passing it on to central repositories 104, or in deciding to which central repository of several central repositories the data should be sent.

In one example embodiment, data origins 101a-101n could be individual consumers' computing devices, central repositories 104a-104n could be servers of websites or other files, each data router 102 could be tasked with load balancing incoming HTTP (hypertext transfer protocol), FTP (file transfer protocol), and other requests between the central repositories or preventing them from receiving a denial-of-service attack. Data store 105 could track which central repository 104a-104n is currently storing which files, track the current utilization of each central repository 104a-104n, or track a running total number of requests from each data origin 101a-101n to inform how a particular request ought to be forwarded or if it should be treated as an attempted denial of service.

In another example embodiment, data origins 101a-101n could be computing devices associated with individual consumers running a torrenting client that is requesting a file, central repositories 104a-104n could be other users who are "seeding" the file and making it available for download via the bittorrent protocol, and a data router 102 could be a router configured to divide requests for chunks of the file among the central repositories 104 in such a way that the total time needed to download the file is minimized.

In another example embodiment, data origins 101a-101n could be computing devices associated with individual consumers or actors within a marketplace, central repositories 104a-104n could be online bidding services or services for finding a best price on a hotel, flight, rental car, or other service, and a data router 102 could be a router configured to query each of the central repositories 104 to find a best source or combination of sources (e.g., a first airline and a second airline for a flight out and a return flight, respectively) and make a reservation while potentially racing against a number of other consumers making bids or seeking reservations.

In another example embodiment, data origins 101a-101n could be computing devices associated with stock brokers, central repositories 104a-104n could be stock exchanges, each data router 102 could be a router configured to determine how to divide or allocate asset purchase and sell orders between multiple exchanges to fulfill the orders, and data store 105 may be a database tracking asset prices and offers in real time to inform the data router whether a given transaction at a given price is possible.

Because in these embodiments, the router may be working with data that no longer reflects reality (such as revoked offers, increased prices, etc.), it is critical to communicate, if possible, when it can be determined that latency is as low as possible and thus the data being worked with is as "fresh" as possible, in order to maximize the ratio between requests acted upon and total requests made. It may instead, in some embodiments, be desirable to maximize a ratio that has been weighted by a total magnitude of each request, so that it measures, for example, the total size of files received compared to the total size requested, or the total value of offers accepted compared to offers made, instead of simply the numbers of files or offers.

Devices 106 of upstream mesh network 103a may be capable of reporting various metrics back to router 102, including current throughput in bits/second or current utilization as a percent or proportion of the device's total processing or bandwidth capacity. These reports may be passed back directly through network 103a, or may, in a preferred embodiment, preserve a one-way directionality of data by sending only through a secondary mesh network, ethernet, or other network 103c. The utilization in terms of throughput or capacity of any given single network node may be modeled as a random walk upward and downward over time from microsecond to microsecond, as traffic through mesh network 103a ebbs, flows, and takes different paths through the mesh network. Differences between devices may cause different effects on that node's contribution to latency, as various models may handle an increase in use with different changes in total efficiency. The utilization data may also comprise information about node failure (such as a router ceasing to function) or connection failure (such as corruption of electrical or optical data within the network due to interference), which will likely lead to huge latency spikes as messages must be retransmitted or rerouted around where a failure is occurring, and put greater stress on remaining nodes and connections.

Network 103b need not report device specific utilization information, as the primary latency desired for analysis is the time taken for a message from a data source 101 to reach a central repository 104 and be processed. Instead, the messages conveyed back through mesh network 103b, confirming receipt of messages sent via mesh network 103a or otherwise reporting status information from the central repositories 104, may comprise precise timestamps (including, in some embodiments, as precise as down to the microsecond level) of when they were sent by a central repository 104. By comparing the timestamp of a confirmation to a stored timestamp of when a message was sent, a total latency can be precisely determined. This total latency may be used to estimate a latency within networks beyond mesh network 103a that complete the link to a central repository 104, by subtracting an estimated or determined latency determined from the utilization data self-reported within mesh network 103a. Latency within these external networks beyond mesh network 103a may also be estimated by taking into account a number of times where messages sent by a data source 101 were rejected because they were inconsistent with a state of affairs that central repository 104 is reporting (e.g., attempting to reserve a seat on a flight that is full, or attempting to accept an offer to buy or sell an asset that has already been accepted by another).

Figure 2:
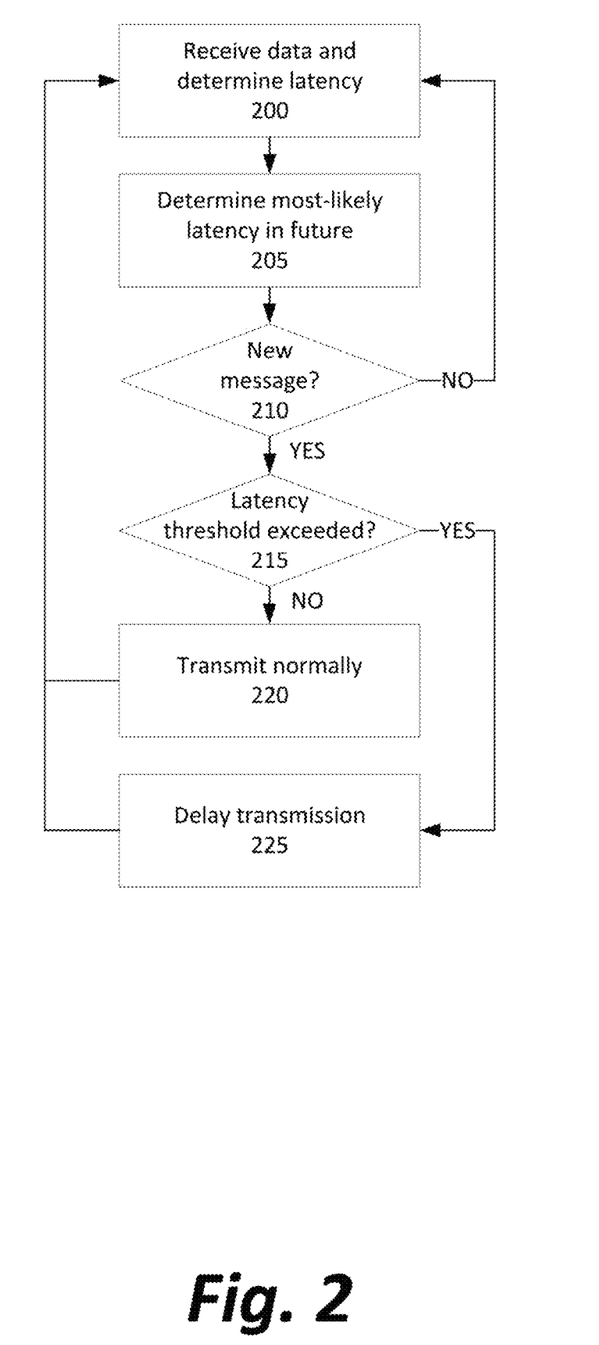
FIG. 2 depicts a method for an artificial intelligence system to process network performance data and avoid transmission of a time-critical packet during a latency spike.

FIG. 2 depicts a method for an artificial intelligence system to process network performance data and avoid transmission of a time-critical packet during a latency spike.

Initially, as described above, the router 102 receives utilization data within mesh network 103a and timing data via mesh network 103b, storing this data for each of a plurality of moments of time, and tracks actual determined latency at each moment in time (Step 200).

An unsupervised learning algorithm is then used upon the stored data for regression analysis, to see a most-likely latency over a future time window (Step 205). For example, the router may determine based on historical data that when utilization is at 70% of capacity, throughput is 10 Gb/s, and external networks have a latency of 10 microseconds, the most likely total latency 5 microseconds from now will be 30 microseconds, in 10 microseconds will be 50 microseconds, in 15 microseconds will be 70 microseconds, in 25 microseconds will be 50 microseconds, and so on, as the network state evolves as if a Markov model where each state is probabilistically related to the state in a previous moment. An example illustration of such a regression model is shows as FIG. 3, described below.

In a preferred embodiment, k-nearest neighbors analysis is used as the form of unsupervised learning. All of the utilization and timing data are stored as n-dimensional points in n-dimensional space, each stored with the latencies that were later recorded after those points. To predict the possible coming latencies for a given network status in the present, some number k of the nearest points to the present values are consulted, and an average, weighted average, or median value is determined from those k points. Nearness may be determined based on Euclidean distance, and the distances in each dimension may be affected by normalization of the data to avoid any one dimension dominating the distance analysis by having a larger range of possible values than other dimensions (for example, how data throughput is theoretically unlimited, but capacity used can only range from 0 to 100%). As k increases, the data volume allows one to predict not only an expected value for latency but also a potentially a probability distribution of possible latencies over a future time window (for example, that in 5 microseconds, the latency will be 90% likely to be between 20 and 40 microseconds).

Over time, whether the router 102 is used or not, further data is received and the model is updated (Steps 200 and 205)

If a new message is received from a data source 101 for transmission in whole or in part to one of the central repositories 104 (Step 210), the router compares the expected future latency given current network conditions to some predefined threshold to see if the threshold is exceeded (Step 215). For example, the threshold might be considered if the expected latency (i.e., the highest probability latency path over time) over a coming time window is always over a certain value (e.g., "over 50 microseconds, during the next millisecond"). Any specific time values, such as a latency of 1 microsecond, or 10 microseconds, or 100 microseconds, or 1 millisecond, or even 1 second or 10 seconds, over a time window that similarly may vary, may be adopted based on the needs of a particular application. Alternatively, the threshold may be considered exceeded when the probability of a latency being over a certain amount during a certain time window is exceeded (e.g., "there is a 5% possibility that latency will be over 70 microseconds during any point of the next millisecond"). The acceptable latencies and length of time may likewise be varied as above, as may the probability (such as 10%, or 5%, or 1%, or less for applications that need to be as certain as possible that latency will not suddenly increase).

If the predefined threshold is not exceeded, the message is transmitted normally to the destination (Step 220), and the system returns to analyzing the incoming data to rebuild the future latency probability model for future time windows and waiting for new messages to transmit.

If the predetermined threshold is exceeded, the router may delay transmission of the message (Step 225). The delay may be, in some embodiments, until the expected latency is back within the threshold. In other embodiments, there may be a maximum time which the message can be delayed before it must be sent, and the message is only delayed until expected latency reaches a minimum point within that time window, despite still being past the latency threshold.

Whether transmitted immediately or after a short delay, the router may "slice" the message into parts in such a way that it minimizes latency and maximizes the probability that the entire request represented by the message will be satisfied. For example, a request for an entire file may be divided proportionally into a request for a small portion of the file from a higher latency repository/network and the remainder of the file from a lower latency repository/network, or a request to purchase a number of shares of stock may be divided among several stock exchanges inversely proportionally to the latencies in the networks of those stock exchanges.

In some embodiments, a coming latency spike may be used to make the decision not to delay all message transmission, but rather to reorder messages in a queue by priority or importance. For example, if there is no latency spike yet, but one is predicted a millisecond in the future, the router 102 may send all high priority messages before the spike is anticipated to hit, and only send low priority messages when a spike is anticipated to be underway.

Figure 3:
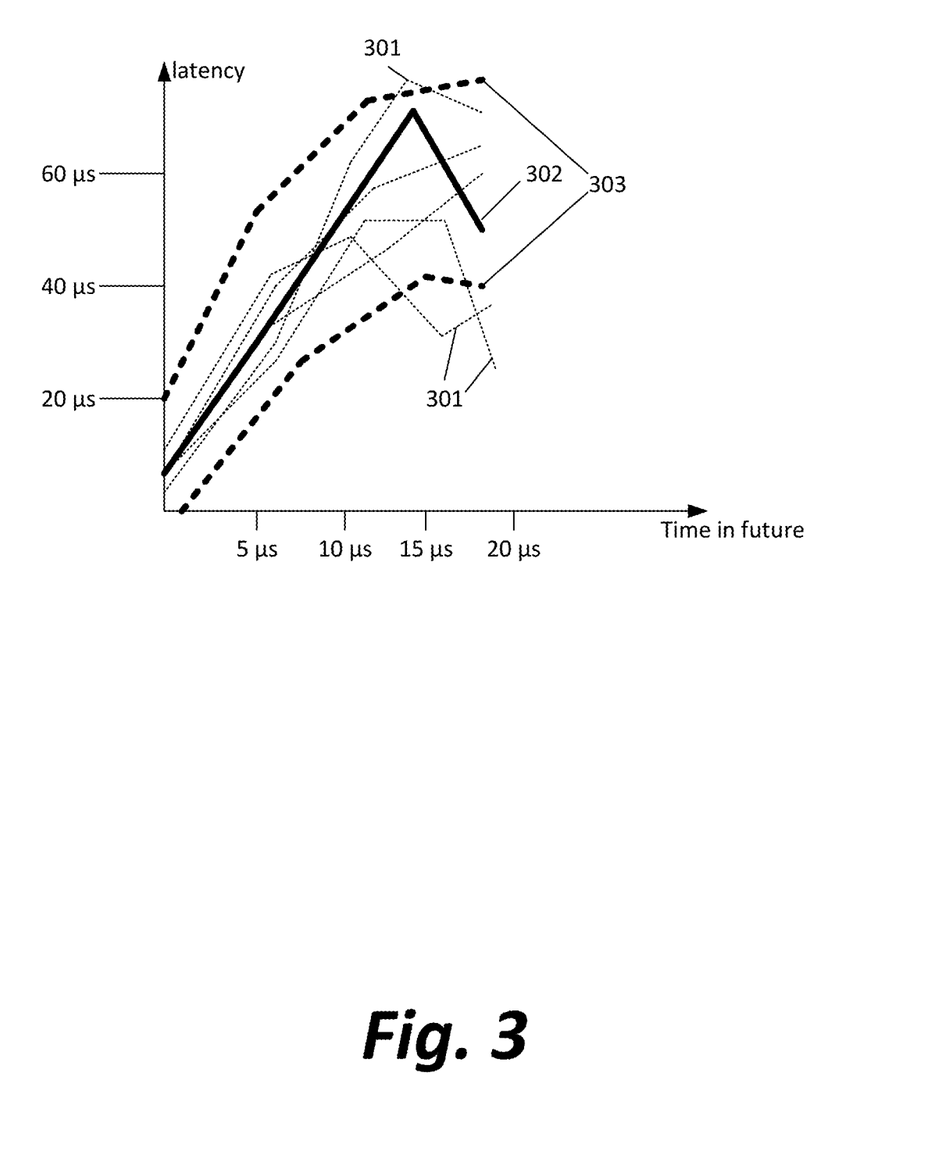
FIG. 3 illustrates a probabilistic latency model that may be generated during the method illustrated in FIG. 2.

FIG. 3 illustrates a model of possible future latencies based on the present observed network status.

As depicted, k is set to 5 for the k-nearest neighbors regression. Five lines 301 each represent an actual latency (vertical axis) that was observed at one of the five times in the past when network conditions closest to the present. The average value 302 of the five historical values may be used as the predicted future latency, or a range 303 (depicted between two dashed lines) may be statistically determined to be the range within which latency will remain with a given probability, such as 90%, or 95%, or 99%. The predicted average 302 or range 303 over time (horizontal axis) may be used to decide the most advantageous time to pause or resume transmission of messages into the network.

Figure 4:
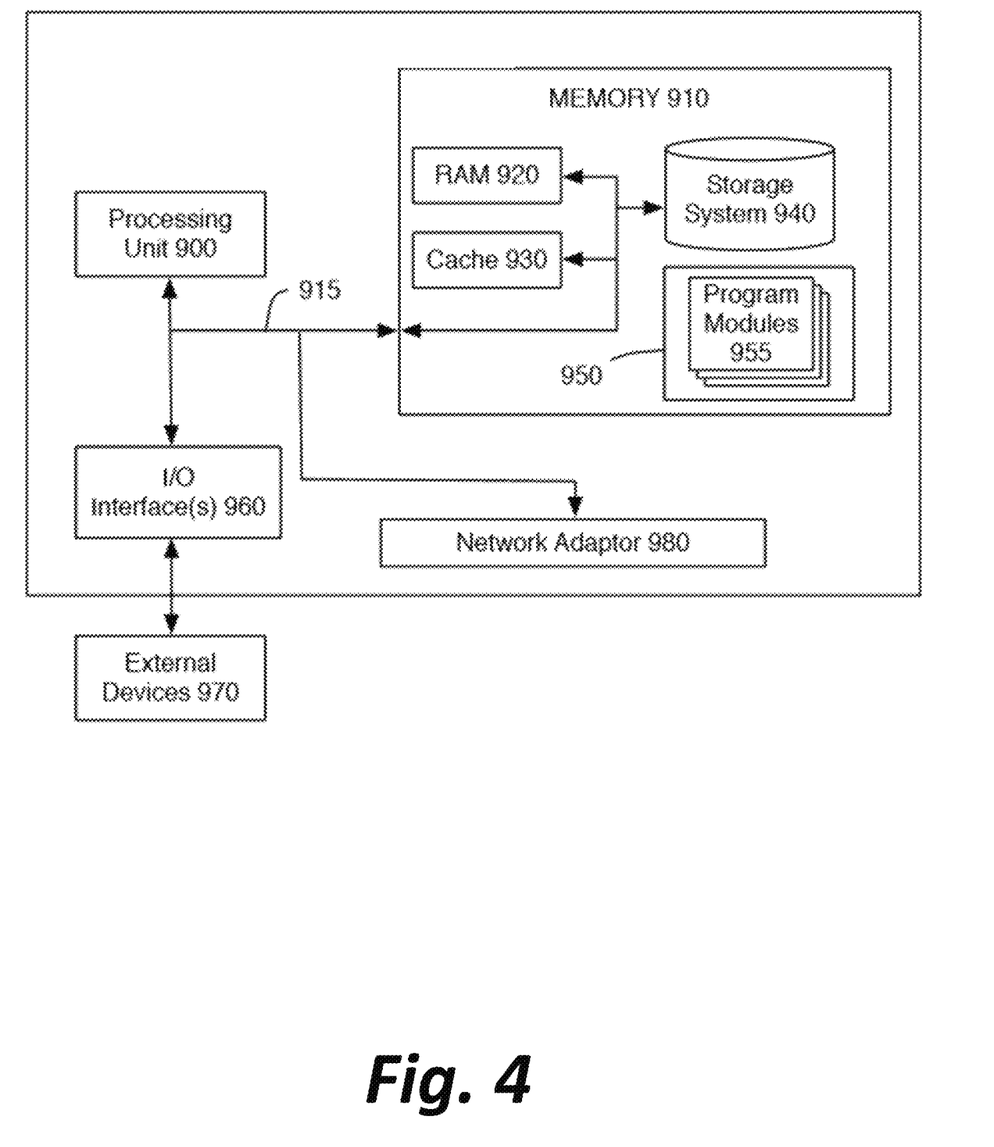
FIG. 4 depicts a general computing device for performing a number of features described above.

FIG. 4 is a high-level block diagram of a representative computing device that may be utilized to implement various features and processes described herein, for example, the functionality of central server 100, sensors 105, or autonomous agents 115. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A programmable network router comprising a processor and non-transitory memory storing instructions that, when executed by the processor, cause the processor to:
continuously receive utilization data from one or more devices of a first mesh network for upstream communication from a client computing device;
continuously receive timing data from one or more devices of the second mesh network for downstream communication to the client computing device;
build and continuously update a probabilistic future latency model based at least in part on a k-nearest neighbors regression model incorporating the utilization data and the timing data, wherein network states at moments in time are represented in the model by multidimensional vectors, wherein the dimensions comprise data throughput and utilization capacity, and wherein the dimensions are each normalized;
receive two or more messages from the client computing device comprising data to be sent to at least one remote computing device of a plurality of remote computing devices via the first mesh network;
assign to a first message of the two or more messages a low priority, and to a second message of the two or more messages a high priority;
determine, using the probabilistic future latency model, a probability that a packet sent when the first mesh network has a current level of utilization will have a latency to its destination greater than a predetermined latency; and
responsive to determining that the probability exceeds a predetermined threshold, delay transmission of a packet comprising data of the second message to be sent to at the least one remote computing device of the plurality of remote computing devices and continue re-computing the probability that a packet sent when the first mesh network has a current level of utilization will have a latency to its destination greater than the predetermined latency until the probability does not exceed the predetermined threshold and the packet comprising data of the second message is transmitted, but transmitting a packet comprising data of the first message while the probability exceeds the predetermined threshold.

2. The router of claim 1, wherein the probabilistic future latency model comprises expected latency data for a plurality of remote networks, each remote network being associated with one remote computing device of the plurality of remote computing devices.

3. The router of claim 2, wherein the expected latency data for each remote network is used to select a subset of the plurality of remote computing devices to which to transmit packets comprising at least part of the data of the second message.

4. The router of claim 3, wherein the expected latency data for each remote network is used to divide a request the data of the second message represents into multiple smaller requests, each sent to one remote computing device of the selected subset of the plurality of remote computing devices in an inverse proportion to expected latencies to the plurality of remote computing devices.

5. The router of claim 1, wherein, when the packet comprising data of the second message must be sent during a predetermined time window, and the probabilistic future latency model predicts that latency will be greater than the predetermined latency throughout the time window, the packet comprising data of the second message is transmitted at a time having a minimum expected latency prior to the end of the time window.

6. A system for network message microtiming, comprising:
a central routing device;

a first mesh network comprising the central routing device and used by the central routing device to transmit data based at least in part on messages from a client computing device;

and a second mesh network comprising the central routing device and used by the central routing device to receive messages comprising data to be forwarded at least in part to the client computing device;

wherein the central routing device comprises a processor and non-transitory memory storing instructions that, when executed by the processor, cause the processor to:

continuously receive utilization data from one or more devices of the first mesh network;

continuously receive timing data from one or more devices of the second mesh network;

build and continuously update a probabilistic future latency model based at least in part on a k-nearest neighbors regression model incorporating the utilization data and the timing data, wherein network states at moments in time are represented in the model by multidimensional vectors, wherein the dimensions comprise data throughput and utilization capacity, and wherein the dimensions are each normalized;

receive a message from the client computing device comprising data to be sent to at least one remote computing device of a plurality of remote computing devices via the first mesh network;

determine, using the probabilistic future latency model, a probability that a packet sent when the first mesh network has a current level of utilization will have a latency to its destination greater than a predetermined latency; and responsive to determining that the probability exceeds a predetermined threshold, delay transmission of a packet comprising data of the second message to be sent to at the least one remote computing device of the plurality of remote computing devices and continue re-computing the probability that a packet sent when the first mesh network has a current level of utilization will have a latency to its destination greater than the predetermined latency until the probability does not exceed the predetermined threshold and the packet comprising data of the second message is transmitted, but transmitting a packet comprising data of the first message while the probability exceeds the Predetermined threshold.

7. The system of claim 6, wherein the timing data comprises a plurality of timestamped messages sent from one or more remote computing devices of the plurality of remote computing devices.

8. The system of claim 6, wherein the probabilistic future latency model comprises expected latency data for a plurality of remote networks, each remote network being associated with one remote computing device of the plurality of remote computing devices.

9. The system of claim 6, wherein the expected latency data for each remote network is used to select a subset of the plurality of remote computing devices to which to transmit packets comprising at least part of the data of the second message.

10. The system of claim 9, wherein the expected latency data for each remote network is used to divide a request the data represents into multiple smaller requests, each sent to one remote computing device of the selected, subset of the plurality of remote computing devices in an inverse proportion to expected latencies to the plurality of remote computing devices.

11. The system of claim 6, wherein transmission of the packet comprising data of the second message is delayed until a minimum current expected latency within a maximum time limit.

* * * * *